Jan. 5, 1971     P. DOSCH ET AL     3,553,556

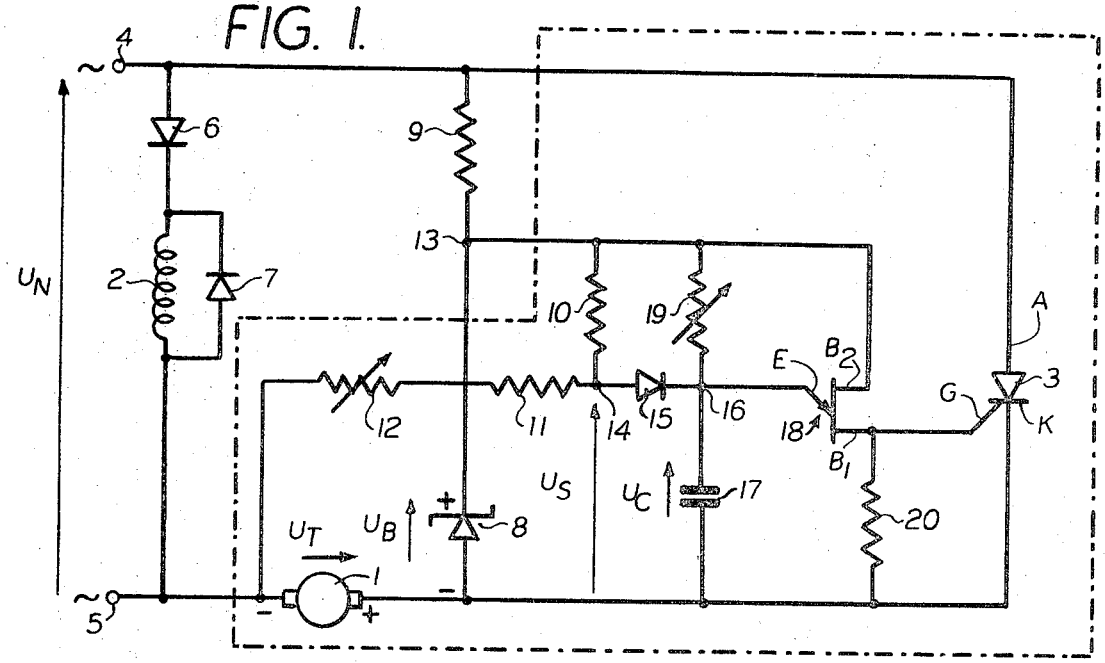
FIG. I.
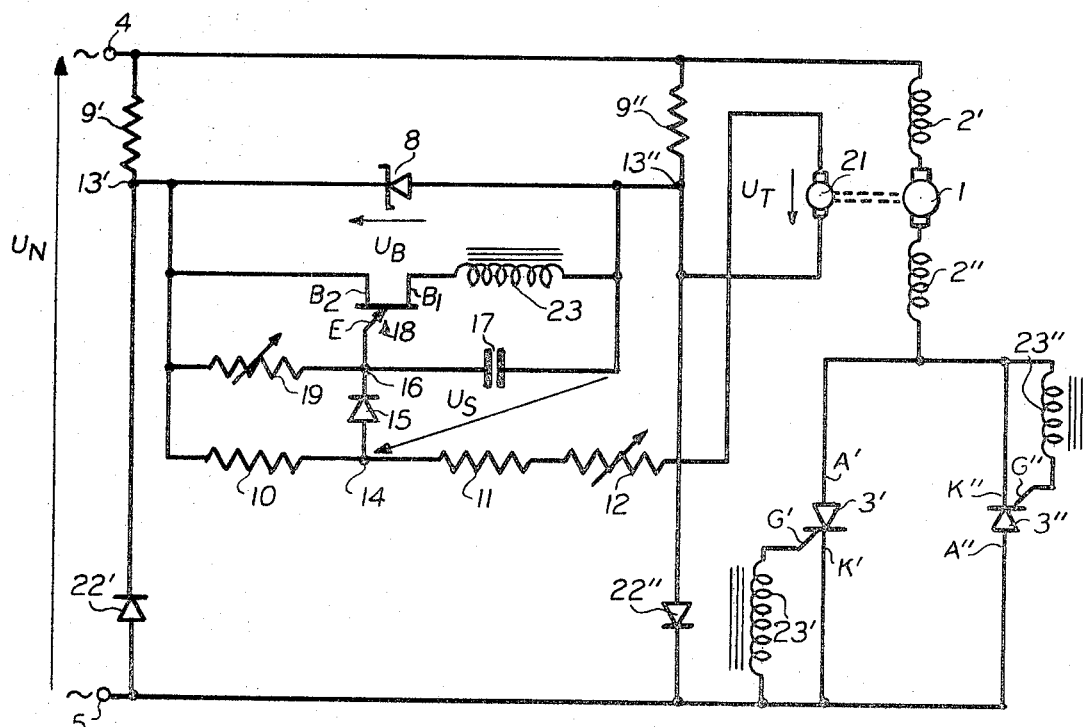
FIG. 2.
INVENTORS
PETER DOSCH
MANFRED OEHMANN
BY
Ward, Haselton, McElhannon, Brooks & Fitzpatrick
ATTORNEYS.

CIRCUIT FOR CONTROLLING THE SPEED OF A MOTOR

Filed Oct. 11, 1967     2 Sheets-Sheet 2

INVENTORS
PETER DOSCH
MANFRED OEHMANN
BY
Ward, Haselton, McElhannon, Brooks & Fitzpatrick
ATTORNEYS.

United States Patent Office 3,553,556
Patented Jan. 5, 1971

3,553,556
CIRCUIT FOR CONTROLLING THE SPEED OF A MOTOR
Peter Dosch, Rankstrasse 15, Jona, and Manfred Oehmann, Rosenbuel, Ebnat-Kappel, both of St. Gall, Switzerland
Filed Oct. 11, 1967, Ser. No. 674,580
Claims priority, application Switzerland, Nov. 1, 1966, 15,778/66; Mar. 20, 1967, 3,980/67
Int. Cl. H02p 5/16
U.S. Cl. 318—327          10 Claims

ABSTRACT OF THE DISCLOSURE

The thyristor for controlling the speed of an A.C. or D.C. motor has its firing current supplied by a phase timing circuit in which a tachometric D.C. voltage proportional to motor speed is combined with a fixed reference voltage and applied to a timing condenser through a voltage divider network such that the "leap" voltage applied to the condenser is a function of the difference between predetermined fractions of said reference voltage and said tachometric D.C. voltage. Auxiliary circuitry limits the starting current and the maximum operating current.

---

The invention relates to a circuit for controlling the speed of revolution of a motor in which the rotor is connected with an alternating current supply via at least one thyristor, and a condenser is provided to effect phase shift firing control of the thyristor, the voltage of the condenser being developed from a "leap" voltage and a "ramp" voltage in each second half period of the alternating voltage.

The circuit operates with a so-called "leap" and "ramp" control, as it is, e.g., known from the General Electric S.C.R. Manual, 3rd edition 1964, under the heading "ramp-and-pedestal control." It is the purpose of the present invention to furnish a circuit of the above-mentioned kind which is arranged in a relatively simple way and operates very exactly and reliably, especially with a practically linear relation between the speed of revolution and the value of a variable resistance. According to the invention, this is achieved by feeding a voltage divider having one leg with a constant resistance value and one leg with a variable resistance value with a voltage which is composed of a constant reference voltage added to a D.C. voltage corresponding to the speed of revolution of the rotor; and by feeding the firing condenser with a voltage serving to form the leap voltage via a diode, this voltage being equal to the difference between the reference voltage and the voltage drop in the leg of constant resistance value; and by further feeding the firing condenser with the reference voltage via a high ohmic resistance in order to form the ramp voltage.

In the appended drawings:

FIG. 1 is a schematic circuit diagram of one embodiment of the invention as applied to the control of a D.C. motor;

FIG. 2 is a schematic circuit diagram of another embodiment of the invention as applied to the control of an A.C. motor;

Figure 3:
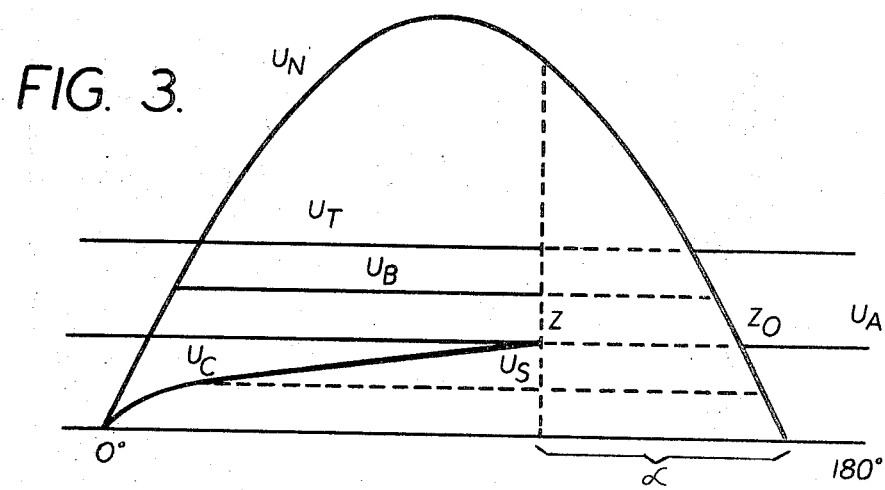
FIG. 3 is a set of voltage curves useful in explaining the operation of FIGS. 1 and 2.

Referring to FIG. 1, the rotor 1 of a D.C. motor to be controlled, the field coil of which is designated by numeral 2, is connected in series with a thyristor 3 between input terminals 4, 5 of the circuit for connection to a source of alternating current. The positive half cycle in the discussion to follow is defined to be the half cycle of the supply voltage in which the terminal 4 is positive with respect to terminal 5.

The field coil 2 of the motor is excited with direct current by means of a series connected diode 6. A further diode 7, which is oppositely poled and arranged in parallel with the field coil 2, causes a field current to flow in those intervals of the source voltage in which the thyristor is non-conductive. As a result, an EMF arises on the rotor terminals of the motor operating as a generator which is a measure of the speed of revolution of the rotor and, therefore, is hereinafter designated as the tachometric D.C. voltage, The tachometric D.C. voltage, $U_T$, the polarity of which is shown in the drawings, is in series with a constant D.C. reference voltage, $U_B$, which is developed across a Zener diode 8 during the positive half cycle of the source voltage 2, the diode 8 being connected via a high resistance 9 to the terminal 4 and through the rotor 1 to the terminal 5. A voltage divider consisting of two fixed resistances 10 and 11 and a variable resistance 12 lies between the point of connection 13 of the Zener diode 8 with the resistance 9 and the terminal 5, so that the sum of the tachometric D.C. voltage $U_T$ and the D.C. reference voltage $U_B$ is applied to this voltage divider.

A diode 15 is connected at one end with the voltage dividing point 14 between the resistances 10 and 11 and at its other end with the junction point 16 between condenser 17 and the emitter, E, of an unijunction transistor 18. Such a transistor is sometimes designated as a double base diode, although such expression, however, is less often used.

Between the points 13 and 16 is connected a very high trimmer resistance 19. The base electrode B1 of the transistor 18, serving as the trigger element, is connected with the control or gate electrode G of the thyristor 3; and the base electrode B2 is connected with the point 13. The condenser 17, serving to fire the thyristor 3, lies between its cathode K and the emitter E of trigger element 18. A resistance 20 connected between the control electrode G and the cathode K functions in known manner to protect the thyristor 3 against undesired firing by leakage currents.

In FIG. 3, $U_N$ represents the supply voltage during a positive half cycle. $U_C$ is the voltage arising on the firing condenser 17. For purpose of clarity, $U_C$ has been drawn to a magnified scale relative to $U_N$. $U_A$ is the releasing voltage of the trigger element 18.

At the beginning of the positive half cycle, the condenser 17 is very rapidly charged in the current branch consisting of elements 10, 15 and 17 under the effect of reference voltage $U_B$, because the time constant $R_{10} \cdot C_{17}$ is very small. In the absence of trimmer resistance 19, the voltage $U_C$ would be a "leap" only reach the voltage $U_S$ of the voltage dividing point 14 shown in dashed lines. The condenser 17, however, is further charged via the trimmer resistance 19, the time constant $R_{19} \cdot C_{17}$ being very high, so that the rise is practically linear; this portion of the curve of the condenser voltage $U_C$ usually being designated as the "ramp." When the condenser voltage $U_C$ reaches the releasing voltage $U_A$, i.e. at the point Z of FIG. 3, the condenser 17 is discharged in the circuit 18, G, K, and the thyristor 3 is fired, i.e current permissive, so that, during the remaining part of the half cycle which corresponds to the angle $\alpha$ of FIG. 3, a current flows over its anode-cathode path and through the rotor 1.

If the value $R_{12}$ of the variable resistance 12 is increased, the divided voltage $U_S$ is also increased, i.e. the "ramp" is superimposed upon a higher "leap"; therefore, the firing point Z in FIG. 3 is shifted to the left, and the current flow angle $\alpha$ is increased. If $R_{12}$ is reduced, Z is shifted to the right, and α is reduced. The resistances 10 and 11 are thus dimensioned that for $R_{12}=0$ the ignition point is practically at the end of the half cycle, i.e. at point $Z_0$.

The division voltage $U_S$, of course, depends on the sum of the voltages $U_B$ and $U_T$, $U_B$ having always the same value, whereas $U_T$ is proportional to the momentary speed of the rotor 1. If, because of increasing load of the motor, its speed is reduced, $U_T$ becomes smaller, and therefore also the current flowing through the voltage divider 10, 11, 12. Consequently, the voltage drop in the resistance 10 becomes smaller, so that the divider voltage $U_S$ becomes higher. This, similar to an increase of $R_{12}$, causes the firing point Z to be shifted to the left. The current flow angle α therefore increases, whereby the speed reduction of the motor is opposed. The sensitivity of the "leap-ramp" control is very high, since because of the small inclination of the "ramp" a small increase or reduction of the "leap" causes shifting of the ignition point Z over a great distance. It must further be noted that the speed of revolution, adjustable by means of the variable resistance, changes practically linearly with the value $R_{12}$ and, hence, with the variation of the control member of the resistance 12.

It is clear that the resistances 11 and 12 may also be replaced by one variable resistance only. If this one resistance can be varied down to zero, the motor can, it is true, only start when the value has reached $R_{11}$, because otherwise, as explained above, $U_C$ remains below $Z_0$.

The circuit of FIG. 2 serves to control an A.C. motor the rotor 1 of which is connected with the supply terminals 4, 5 via two field coils 2', 2" connected in series and two thyristors 3' and 3" connected in antiparallel relationship; consequently, both half waves of the supply voltage are used. The rotor 1 drives a small direct current generator 21 which furnishes the tachometric D.C. voltage $U_T$. The Zener diode 8, serving to produce the reference voltage $U_B$, lies as a bridge between the connection points 13' and 13" of each resistance 9' and 9", respectively. The two diodes 22' and 22" are oppositely poled, so that in both half cycles of the supply voltage $U_N$ the same reference voltage $U_B$ appears on the Zener diode 8. Between the point 13' and the generator 21 is placed the voltage divider 10, 11, 12, so that the same is again under the influence of the voltages $U_T$ and $U_B$. Between the points 13' and 13" is situated the series circuit of the trimmer resistance 19 and the firing condenser 17, the junction point 16 of which is again connected to the voltage division point 14 and to the emitter E of the unijunction transistor 18.

The primary coil 23 of a transformer lies also between the bridge points 13' and 13" via the transistor bases B1 and B2, while its secondary coils 23' and 23" are placed between the cathodes K' and K", and the gate electrodes G' and G", respectively, of the thyristors 3' and 3", respectively.

Each time the condenser 17 is discharged via the transistor 18 and the primary coil 23, which now occurs each half cycle, each of secondary coils 23' and 23" receives a firing impulse. However, always only the one thyristor 3' or 3" can be fired whose anode A' or A" is at the moment positive. In other respects, the circuit of FIG. 2 operates in the same way as the circuit of FIG. 1.

Figure 4:
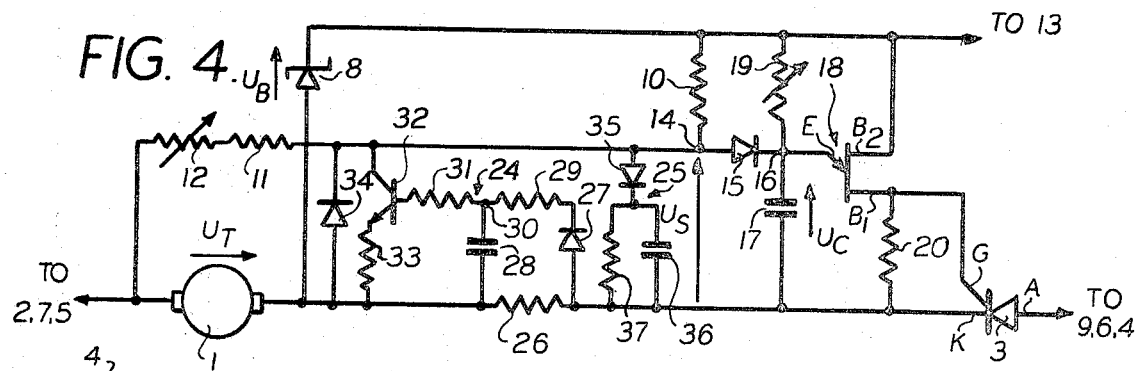
FIG. 4 shows a modification of the circuit of FIG. 1.

The FIG. 4 shows a variant of the circuit of FIG. 1 being intended to replace the part within the dash-dot line of FIG. 1. In this variant, two current limiting circuits 24 and 25 are provided, one of which (24) limits the rotor current in operation, while the other one (25) limits the rotor current upon starting of the motor or upon rapid increase of the desired speed.

The circuit 24 comprises a very small measuring resistance 26 of the order of $10 \times 10^{-3}$ ohms placed between the thyristor 3 and the rotor 1, and across which in operation a small voltage drop appears which, in a way which will be described later on, prevents the rotor current from further increasing when a certain maximum value—which is still permitted in permanent operation—is reached. For this purpose, the measuring resistance 26 is connected with a resistance 29 via a diode 27 on one hand and via a condenser 28 on the other hand, and the connection point 30 between the resistance 29 and the condenser 28 is connected with the base of a transistor 32 via a resistance 31. The collector of transistor 32 is connected with the voltage dividing point 14, while its emitter is connected with the positive terminal of the rotor 1 via a resistance 33. Between this terminal and the voltage dividing point 14 a diode 34 is also provided.

Aside from the current limitation, the circuit of FIG. 1 equipped with the variant of FIG. 4 operates exactly in the same manner as explained in connection with FIG. 3. As long as the rotor current does not exceed the permitted permanent value, the voltage drop across measuring resistance 26 is smaller than the threshold voltage of diode 27 in its permissive direction. The diode 27, therefore, only becomes conductive when the rotor current exceeds its permitted value because of an increase of the motor load, whereupon the diode current charges the condenser 28 via resistance 29. The base of the transistor 32, therefore, becomes positive with respect to its emitter, so that the collector-emitter path becomes conductive and a current flows in the current branch 13, 10, 14, 32, 33. The voltage drop in resistance 10 is thereby increased, so that the division voltage $U_S$ is reduced which, as has been explained by means of FIG. 3, results in a reduction of the current flow angle α and, therefore, in reduction of the intensity of the rotor current. The resistance 33, which also provides emitter negative feed-back, prevents oscillations from arising, i.e. the transistor 32 from constantly opening and closing once the measuring voltage has surpassed the permitted value. The diode 34 prevents the collector of the transistor from becoming momentarily negative with respect to the emitter or the base.

It can be seen that the current limiting circuit 24 suppresses the normal effect of the speed control, namely, increase of the current flow α upon increasing load on the rotor in order to maintain the selected speed of revolution, as soon as the operating voltage becomes too high. Upon starting of the motor, the circuit 24 should not yet be effective since higher rotor current are momentarily allowed. The time constant $R_{29} \cdot C_{28}$, therefore, must be chosen relatively large.

If it was desired, heretofore, to protect the rotor from excessive currents in permanent operation, it was usual to connect a protective resistance of several ohms in series with the same. Depending on the size of the motor, the lost power of such a protective resistance could reach considerable values; also, the resistance used in this case was considerably more expensive than the circuit 24.

In order to avoid excessively high current peaks upon starting of the motor under load and under an already preselected speed of revolution by means of variable resistance 12, or upon rapid variations of the position of the variable resistance 12 to higher speeds of revolution of the rotor, a limiting circuit is provided as previously mentioned. This limiting circuit comprises a diode 35 which, on one hand, is connected with the voltage divider point 14, and on the other hand with the cathode K of thyristor 3 via the parallel circuit composed of a condenser 36 and of a resistance 37. It is clear, that, when the terminals 4 and 5 are connected with the supply voltage via a switch (not shown), or when the value of the variable resistance 12 is suddenly increased, the divided voltage cannot immediately rise to the value corresponding to the dividing proportion since at first an additional current serving to load the condenser 36 flows through the resistance 10.

The "leap" $U_S$ of $U_C$ of the firing condenser 17, therefore, is smaller than it would be without the circuit 25, so that the current flow angle α is smaller and an inadmissible current peak is avoided. The resistance 37 only serves to discharge the condenser 36, so that the latter cannot remain under a load exceeding the dividing voltage $U_S$, which, upon rapid switching on and off would make the circuit 25 ineffective. The resistance 37, however, is so big that it can be neglected with respect to the divisional proportion of the voltage divider 10, 11, and 12.

It can be seen that the current limiting circuit 25 can also be used in the case of FIG. 2 without difficulties, whereas the current limiting circuit 24 would have to be somewhat altered.

Figure 5:
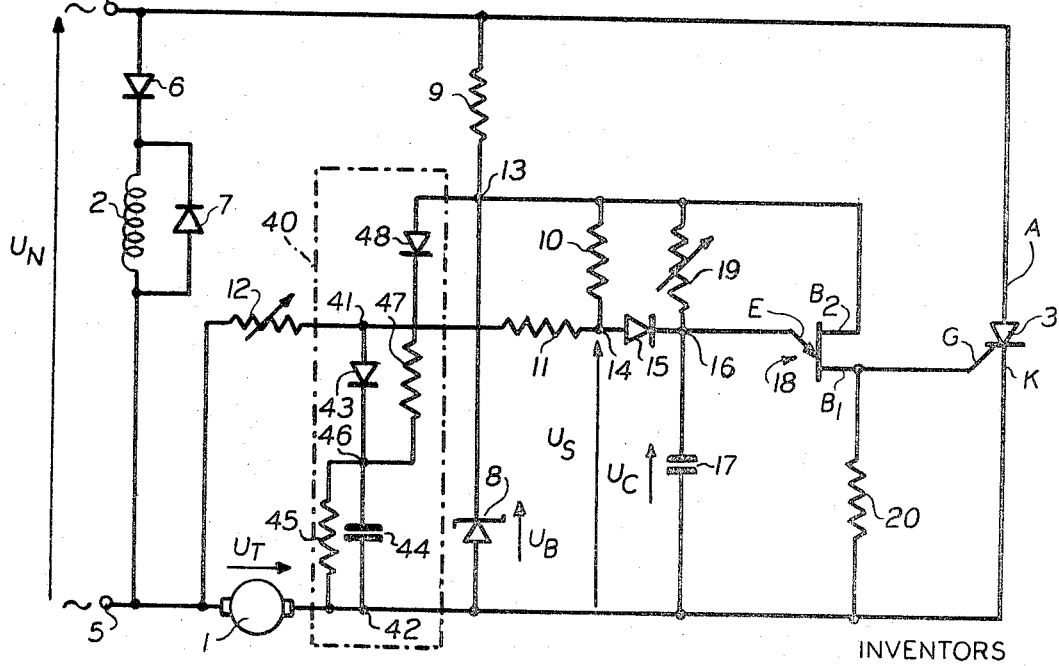
FIG. 5 shows a still further modification of the circuit of FIG. 1.

The current limiting circuit 25 in FIG. 4 is connected between point 14 and the positive end of rotor 1 so as to respond to the voltage $U_S$. An important improvement can be obtained by shifting the connection from point 14 to the junction between the constant resistance and the variable resistance which together form the voltage divider leg of variable resistance value, and by connecting the junction between the diode and the retarding condenser via a high ohmic resistance and a second diode to a point which is at a higher voltage than the first mentioned junction relative to the junction between the firing condenser and the retarding condenser. Such an arrangement will now be described with reference to FIG. 5. The circuit in FIG. 5 corresponds, with the exception of the elements forming the current limiting circuit which are contained in the rectangle shown in dash-dot lines, to the embodiment of FIG. 1, and operates in the same manner.

The circuit 40 prevents the rotor current from reaching inadmissible peak values during starting of the motor, $U_T$ being at first zero. For this purpose, a diode 43 is inserted in series with the parallel arrangement of a retarding condenser 44 and a high ohmic resistance 45 between the connection point 41 of the resistances 12 and 11 and the connection point 42 of the rotor 1 with both the Zener diode 8 and the firing condenser 17. Additionally, the connection point 46 between the diode 43 and the condenser 44 is connected with connection point 13 via the series arrangement of a high ohmic resistance 47, the resistance of which, however, is notably lower than that of the resistance 45, and a diode 48.

If in order to start the motor 1, 2, the terminals 4, 5 are fed with the supply current, the voltage $U_S$ is relatively high when no current limiting circuit 40 is provided, because the voltage $U_T$ is first equal to zero. The firing of the thyristor which occurs within each positive half cycle takes place under a high current flow angle, so that the current flowing through the rotor 1 is of high intensity. If now the circuit 40 is provided, in the first moment, not the voltage drop across resistance 11 and 12, but only the voltage drop across resistance 11 reaches the condenser 17 via the diode 15, because the condenser 44, discharged via the relatively high resistance 45, at first has the same effect as a short-circuit. The leap voltage, therefore, is essentially smaller, and $R_{11}$ is of such intensity that the firing occurs nearly at the end of the positive half cycle. When the condenser 44 is charged, both $U_S$ and the leap voltage increase, and the current flow angle increases until it reaches the value which corresponds to the position of the variable resistance and to the mechanical load of the rotor 1, without reaching inadmissible peak values.

The charging of the condenser 44 is effected from point 13, partly via the resistances 10 and 11 and the diode 43, and partly via the diode 48 and the resistance 47 of e.g. $0.1 \times 10^3$ ohms. Since the time constant $(R_{10}+R_{11}) C_{44}$ is relatively small, the potential of the point 46 rapidly rises to the value determined by the proportion $$R_{12} : (R_{10}+R_{11})$$

and by the voltage $U_T$, and then further rise to a value determined by the proportion $R_{47} : R_{45}$ until the diode 43 is cutoff. Without this additional voltage, the regulation of the speed of revolution to the constant value selected by means of the variable resistance 12, due to loading and unloading of the condenser 44, would be delayed, since the voltage $U_S$ would only slowly follow small alterations of the speed reflected in the voltage $U_T$ caused by alterations of the load. The resistance 45 prevents the condenser 44 from charging to the potential of the point 13 and remaining so charged, whereby the circuit 40 would be made ineffective upon repeated starting and stopping of the motor.

Although the current limiting circuit 40 has been explained in connection with the example of FIG. 1, it can also be applied to the example shown in FIG. 2 without any difficulties.

The invention has been described with reference to certain preferred embodiments thereof. It will be apparent to those skilled in the art that numerous changes may be made without departing from the true spirit of the invention as defined in the appended claims.

What is claimed is:

1. A circuit for controlling the speed of a motor comprising at least one thyristor having an anode, a cathode and a control gate, means for connecting said motor to a source of alternating current voltage in series with said anode and cathode, means for providing, between a first point and a second point, a fixed direct current reference voltage from said source voltage with said first point being of positive polarity and said second point of negative polarity, a condenser, a first resistor, means connecting said first resistor directly between said first point and one end of said condenser, the other end of said condenser being connected directly to said second point, an electron control trigger element having first and second electrodes defining a controlled path and a control electrode for said path, means coupling said first electrode to said thyristor control gate for controlling the conduction of said thyristor, means providing a direct connection from the junction between said condenser and said first resistor to said control electrode, means coupling said first and second electrodes respectively to said first and second points, a second resistor having an appreciably lower resistance than said first resistor, a unidirectional conducting device connected between said junction and one end of said second resistor, the other end of said second resistor being connected to said first point, said unidirectional conducting device being poled to pass current through said condenser from said fixed reference voltage means, adjustable resistance means having a predetermined minimum resistance, one end of said adjustable resistance means being connected to said one end of said second resistor, a source of unidirectional EMF proportional to the speed of said motor, and means connecting a positive and negative pole of said source of EMF, respectively, to said second point and the free end of said adjustable resistance means, whereby the speed of said motor is controlled by adjustment of said adjustable resistance means in a nearly linear fashion with high sensitivity.

2. A circuit according to claim 1, wherein said motor is of the direct current type having stationary field windings and a rotor, said rotor being connected in series with the anode and cathode of said one thyristor, further comprising a second unidirectional conducting device, means for connecting said field windings in series with said second unidirectional conducting device across said source of alternating current voltage, and a third unidirectional conducting device for connection in parallel with said field windings oppositely poled relative to said second unidirectional conducting device.

3. A circuit according to claim 1, wherein said source of unidirectional EMF comprises a tachometer generator coupled to said motor.

4. A circuit according to claim 1, wherein said source of unidirectional EMF comprises the armature of said motor.

5. A circuit according to claim 1, wherein a second thyristor is provided connected in parallel with said first thyristor but poled in the opposite direction, and means are provided coupling said first electrode of said trigger element to the control gate of said second thyristor, and wherein said motor is of the alternating current type.

6. A circuit for controlling the speed of a motor comprising a thyristor, first and second terminals for connection to a source of alternating current voltage, a first connecting point and a second connecting point, said thyristor having its anode and cathode electrodes connected in series relation between said first terminal and said first connecting point, means for connecting the rotor of the motor between said two connecting points, said second connecting point being connected with said second terminal, means including rectifying means for connecting the field winding of said motor between said two terminals, a voltage dividing network coupled between said two terminals, a voltage regulating device connected between said first connecting point and the end of said dividing network which is remote from said second terminal, a condenser, a unilateral conducting device connected between one end of said condenser and an intermediate point on said dividing network, said unilateral conducting device being poled to pass current in the forward direction during the half cycle of the voltage from said source when said thyristor is biased in the forward direction, the other end of said condenser being connected to said first connecting point, a resistance element connected between said one end of the condenser and said remote end of the dividing network, and means coupling said one end of the condenser to the input control electrode of said thyristor.

7. A circuit according to claim 6, wherein the means for connecting the field winding of the motor between said two terminals comprises a first rectifying element for connection in series with said field winding and an oppositely poles second rectifying element for connection in parallel with said field winding.

8. A circuit according to claim 6, further comprising an impedance connected between said thyristor and said first connecting point, an electron flow control device connected between said first connecting point and said intermediate point on the dividing network, and means coupled across said impedance responsive to the voltage drop thereacross for rending said flow control device conductive when said voltage top exceeds a given value.

9. A circuit according to claim 6, further comprising a second resistance element a second condenser, and a second unilateral conducting device, said second unilateral conducting device being connected in series with said second resistance element and said second condenser in parallel to provide a limiting network, said limiting network being connected between said first connecting point and said intermediate point on said voltage dividing network, said second unilateral conducting device being poled similarly to said first mentioned unilateral conducting device.

10. A circuit according to claim 6, further comprising a second and a third unilateral conducting device, a second and a third resistance element, and a second condenser, said second unilateral conducting device being connected in series with the parallel circuit of said second resistance element and said second condenser between said first connecting point and another intermediate point on said voltage dividing network closer to said second connecting point than said first mentioned intermediate point, said third unilateral conducting device being connected in series with said third resistance element between the junction of said second unilateral conducting device with said parallel circuit and said remote end of the voltage dividing network, said second and third unilateral conducting devices being poled similarly to said first mentioned unilateral conducting device.

References Cited

UNITED STATES PATENTS

| 3,201,624 | 8/1965 | Wilkerson | 318—326X |
| 3,411,063 | 11/1968 | Schoonover | 318—345X |

ORIS L. RADER, Primary Examiner

H. HUBERFELD, Assistant Examiner

U.S. Cl. X.R.

318—345, 507